(12) United States Patent
Suga (10) Patent No.: US 10,764,456 B2
(45) Date of Patent: Sep. 1, 2020

(54) IMAGE READING APPARATUS

(71) Applicant: CANON KABUSHIKI KAISHA, Tokyo (JP)

(72) Inventor: Takayuki Suga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/460,971

(22) Filed: Jul. 2, 2019

(65) Prior Publication Data

US 2020/0036839 A1  Jan. 30, 2020

(30) Foreign Application Priority Data

Jul. 24, 2018 (JP) .................................. 2018-138378

(51) Int. Cl.
*H04N 1/00* (2006.01)
*H04N 1/04* (2006.01)

(52) U.S. Cl.
CPC ............. *H04N 1/0083* (2013.01); *H04N 1/04* (2013.01)

(58) Field of Classification Search
CPC ...... B41J 11/0015; B41J 19/202; B41J 29/13; B41J 2/165; B41J 2/17509; B41J 2/17513; B41J 2/1752; B41J 2/17523; B41J 2/17553; B41J 2/1753; B41J 2/17546; B41J 2/17566; F16G 1/22; F16G 1/28; H04N 1/00559; H04N 1/1017; H04N 1/103; H04N 1/1039; H04N 2201/0094; H04N 2201/0428; H04N 2201/0442; H04N 2201/0458; G06F 1/1616; G06F 1/1635; G06F 1/1656; G06F 1/1658; G06F 1/1681; G06F 1/1683; G06F 1/1688; G06F 1/203

USPC ................................................ 358/1.15, 1.14
See application file for complete search history.

(56) References Cited

U.S. PATENT DOCUMENTS

| | | | | |
|---|---|---|---|---|
| 2004/0066542 A1* | 4/2004 | Chang | ................ | H04N 1/00533 358/494 |
| 2004/0232611 A1* | 11/2004 | Fujioka | ...................... | B41J 3/46 271/276 |
| 2006/0033775 A1* | 2/2006 | Tsai | .......................... | B41J 19/00 347/50 |
| 2006/0139700 A1* | 6/2006 | Murakami | ............. | H04N 1/125 358/474 |
| 2006/0197997 A1* | 9/2006 | Oshida | ..................... | H04N 1/12 358/498 |

(Continued)

FOREIGN PATENT DOCUMENTS

JP  2017-147655  8/2017

*Primary Examiner* — Negussie Worku
(74) *Attorney, Agent, or Firm* — Venable LLP (57) ABSTRACT

An image reading apparatus includes a sheet support surface, a reading unit, a main body portion configured to accommodate the reading unit, and a flat cable being curved while the reading unit moves in the sub-scanning direction, wherein the main body portion includes a sliding contact surface configured to be brought into sliding contact with a flat surface of the flat cable, and a side surface facing the reading unit in the sub-scanning direction, the housing includes a first surface facing the sliding contact surface and abutting against the flat surface of the flat cable, a second surface facing the side surface, and a connecting surface configured to connect the first surface and the second surface, and the connecting surface abuts against the flat surface of the flat cable in a case where the reading unit performs the reading operation.

9 Claims, 6 Drawing Sheets

(56) References Cited

U.S. PATENT DOCUMENTS

| | | | |
|---|---|---|---|
| 2007/0291333 A1* | 12/2007 | Suga | H04N 1/024 358/509 |
| 2009/0009824 A1* | 1/2009 | Nakayama | H04N 1/00002 358/474 |
| 2010/0110159 A1* | 5/2010 | Kawamoto | H04N 1/00519 347/224 |
| 2012/0307318 A1* | 12/2012 | Suga | H04N 1/0249 358/474 |
| 2014/0160539 A1* | 6/2014 | Wei | H04N 1/00557 358/494 |
| 2014/0192114 A1* | 7/2014 | Ito | B41J 19/005 347/37 |
| 2015/0035914 A1* | 2/2015 | Takeuchi | B41J 2/17523 347/85 |
| 2015/0098744 A1* | 4/2015 | Nakanishi | B41J 29/13 399/405 |
| 2015/0281483 A1* | 10/2015 | Shiomi | H04N 1/00559 358/474 |
| 2016/0352927 A1* | 12/2016 | Hozono | H04N 1/0083 |
| 2017/0180579 A1* | 6/2017 | Suga | H04N 1/00559 |
| 2017/0272598 A1* | 9/2017 | Suga | H04N 1/02855 |
| 2018/0183958 A1* | 6/2018 | Ishii | H04N 1/00708 |
| 2018/0290455 A1* | 10/2018 | Tanaka | B41J 2/16517 |

* cited by examiner

IMAGE READING APPARATUS

BACKGROUND OF THE INVENTION

Field of the Invention

The present invention relates to an image reading apparatus that reads an image of a sheet.

Description of the Related Art

Conventionally, an image reading apparatus that reads an image of a document by scanning a document placed on a document platen glass by an image sensor unit is proposed (see JP-A-2017-147655). The image sensor unit is fixed to an annular endless timing belt. When the timing belt rotates, the image sensor unit moves in a scanning direction. The image sensor unit is connected to a flat cable for transmitting a read signal and power with a control unit of an apparatus main body. A cable regulating member having a protrusion shape portion protruding in a thickness direction of the flat cable is fixed to the flat cable.

A base frame accommodating the image sensor unit is provided with a guide member for guiding the flat cable, and the guide member is provided with a recess portion engageable with the protrusion shape portion of the cable regulating member. When the image sensor unit moves in the scanning direction, the flat cable is prevented from being formed with deflection by engaging the protrusion shape portion moving together with the flat cable, with the recess portion. Therefore, breakage of the flat cable due to being caught in the image sensor unit is reduced.

However, the image sensor unit described in JP-A-2017-147655 has a corner coming into contact with the flat cable, and the flat cable is loaded by the contact between the corner and the flat cable. In particular, since the image sensor unit repeatedly moves in the scanning direction, the corner of the image sensor unit repeatedly comes into contact with the flat cable, and there is a concern that the flat cable is broken.

SUMMARY OF THE INVENTION

According to one aspect of the present invention, an image reading apparatus includes a sheet support surface through which light is transmitted and on which a sheet is supported, a reading unit configured to perform a reading operation of reading an image of the sheet supported on the sheet support surface while moving in a sub-scanning direction, and including a light source configured to irradiate the sheet supported on the sheet support surface with the light through the sheet support surface, an imaging unit configured to receive the light irradiated from the light source and reflected by the sheet, and convert the light into an image signal, and a housing configured to support the light source and the imaging unit, a main body portion configured to accommodate the reading unit, and a flat cable of which one end is connected to the reading unit, and which transmits the image signal to the reading unit, the flat cable being curved while the reading unit moves in the sub-scanning direction, wherein the main body portion includes a sliding contact surface extending in the sub-scanning direction and configured to be brought into sliding contact with a flat surface of the flat cable in a case where the flat cable is being curved, and a side surface facing the reading unit in the sub-scanning direction, wherein the housing includes a first surface facing the sliding contact surface and abutting against the flat surface of the flat cable, a second surface facing the side surface and disposed at a position farther from the sliding contact surface than the first surface in a main-scanning direction orthogonal to the sub-scanning direction, and a connecting surface disposed at a position farther from the sliding contact surface in the main-scanning direction than a first extension line including the first surface and farther from the side surface in the sub-scanning direction than a second extension line including the second surface when viewed in a normal direction orthogonal to a surface direction of the sheet support surface, and configured to connect the first surface and the second surface, and wherein the connecting surface abuts against the flat surface of the flat cable in a case where the reading unit performs the reading operation.

Further features of the present invention will become apparent from the following description of exemplary embodiments with reference to the attached drawings.

DESCRIPTION OF THE EMBODIMENTS

Overall Configuration

Hereinafter, embodiments will be described with reference to the drawings. In the embodiments, a document is a type of a sheet, and in addition to plain paper, the sheet includes special paper such as coated paper, a recording medium having a special shape such as an envelope and index paper, a plastic film, clothes for overhead projector, and the like. The document may be blank paper or may have an image formed on one side or both sides.

Figure 1:
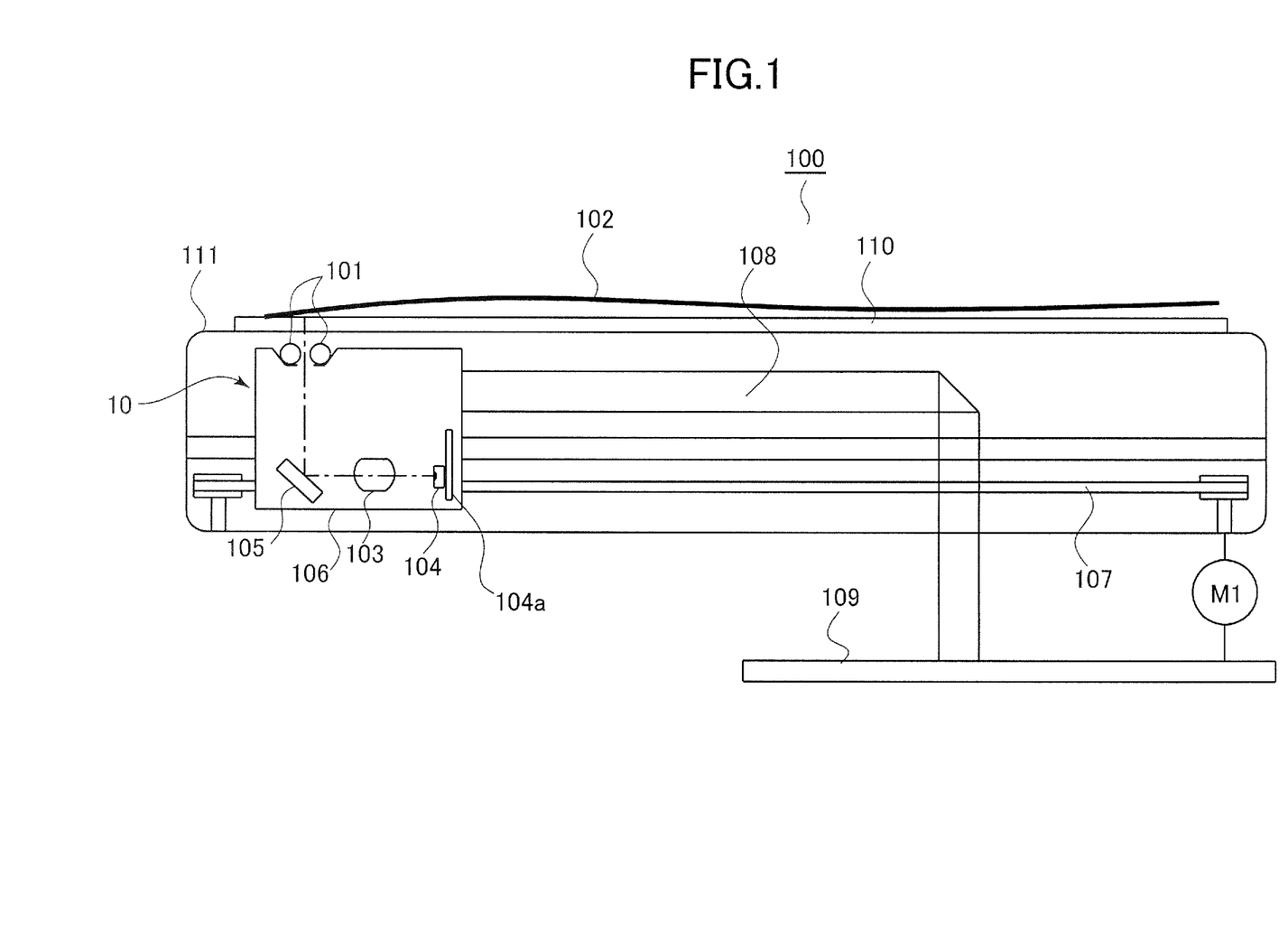
FIG. 1 is a schematic view illustrating an image reading apparatus.
Figure 2:
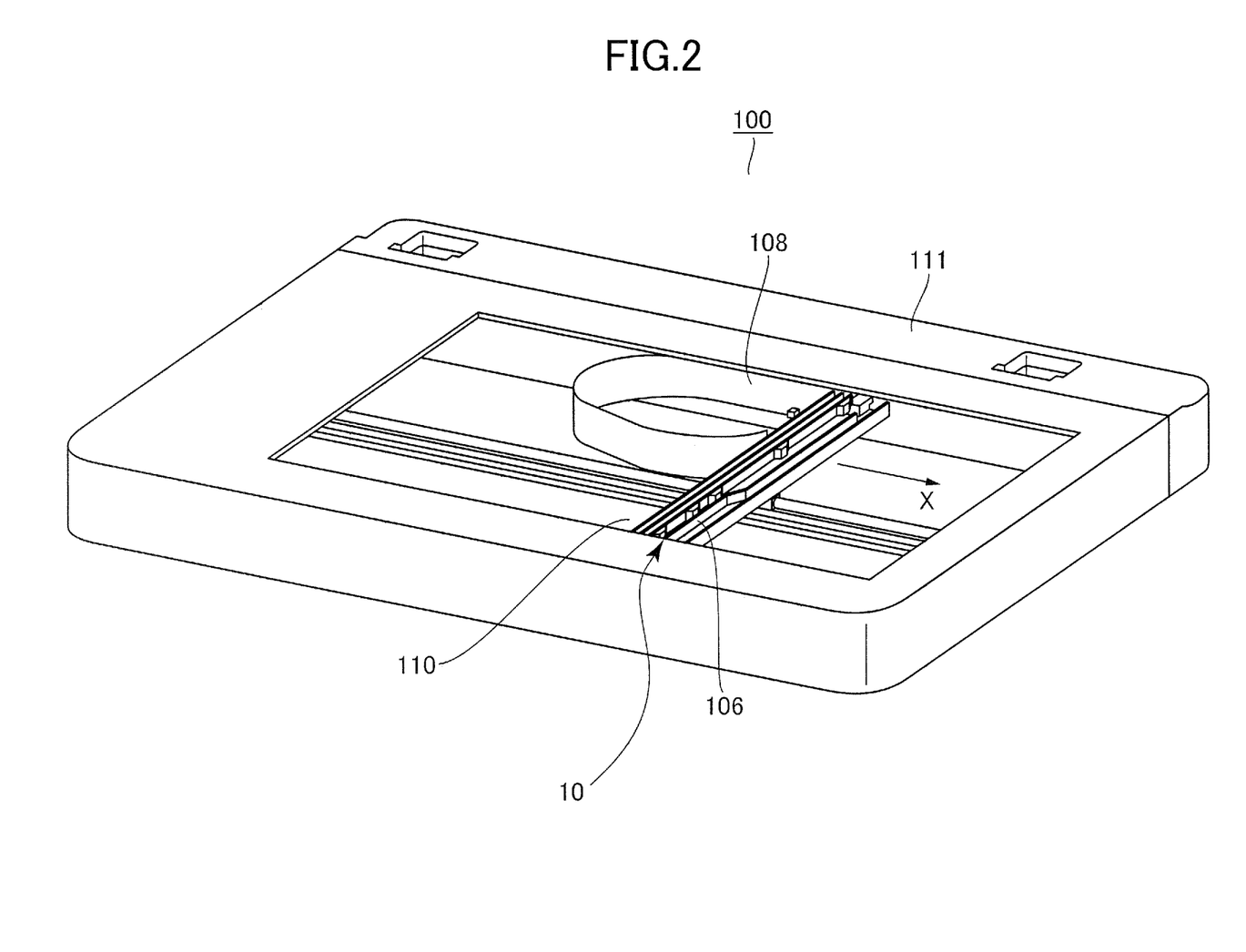
FIG. 2 is a perspective view illustrating the image reading apparatus.

As illustrated in FIGS. 1 and 2, an image reading apparatus 100 includes a main body portion 111 and a reading unit 10 accommodated in the main body portion 111. The main body portion 111 supports a document platen glass 110 serving as a sheet support surface through which light is transmitted and on which a document 102 is supported, a timing belt 107 rotationally driven by a motor M1, and a guide shaft (not illustrated).

The reading unit 10 includes lamps 101 as light sources, a mirror 105, a lens 103, a CCD line sensor 104 serving as an imaging unit, a printed substrate 104a on which the CCD line sensor 104 is mounted, and a carriage 106 serving as a housing. The lamps 101, the mirror 105, the lens 103, the CCD line sensor 104, and the printed substrate 104a are supported by the carriage 106, and the carriage 106 is coupled to the timing belt 107. One end of a flexible flat cable (FFC) 108 serving as a flat cable is connected to the printed substrate 104a and the other end of the FFC 108 is connected to a control substrate 109 provided outside the image reading apparatus 100.

In the embodiment, the CCD line sensor 104 is used but, for example, another sensor such as a CMOS or a CIS may be used. The CCD line sensor 104 may not be directly mounted on the printed substrate 104a as long as the CCD line sensor 104 is electrically connected to the printed substrate 104a.

When the document 102 is placed on the document platen glass 110 and a copy job is input, the lamps 101 of the reading unit 10 are turned on and the document 102 on the document platen glass 110 is irradiated with the light of the lamps 101 through the document platen glass 110. The timing belt 107 is rotated by the motor M1 and the reading unit 10 is moved in a sub-scanning direction (arrow X direction in FIG. 2) while being guided by the guide shaft. The light emitted from the light source and reflected by the document 102 is guided to the lens 103 by the mirror 105 and is focused on the CCD line sensor 104.

The CCD line sensor 104 photoelectrically converts the focused light using a light detecting element and outputs an image signal corresponding to an incident light quantity to the printed substrate 104a. The image signal output to the printed substrate 104a is transmitted to the control substrate 109 through the FFC 108. As described above, the reading unit 10 reads an image of the document 102 placed on the document platen glass 110 while moving in the sub-scanning direction. The FFC 108 transmits not only the image signal but also control signals of the lamp 101 and the CCD line sensor 104, and power.

A reading method by the reading unit 10 has two types of fixed reading and document flow reading, and the reading method described above is the fixed reading. In a case of the document flow reading, an auto document feeder (ADF) is provided above the document platen glass 110 of the image reading apparatus 100 and an image of the document conveyed by the ADF is read without moving the reading unit 10.

Configurations of Main Body Portion and Carriage

Figure 3A:
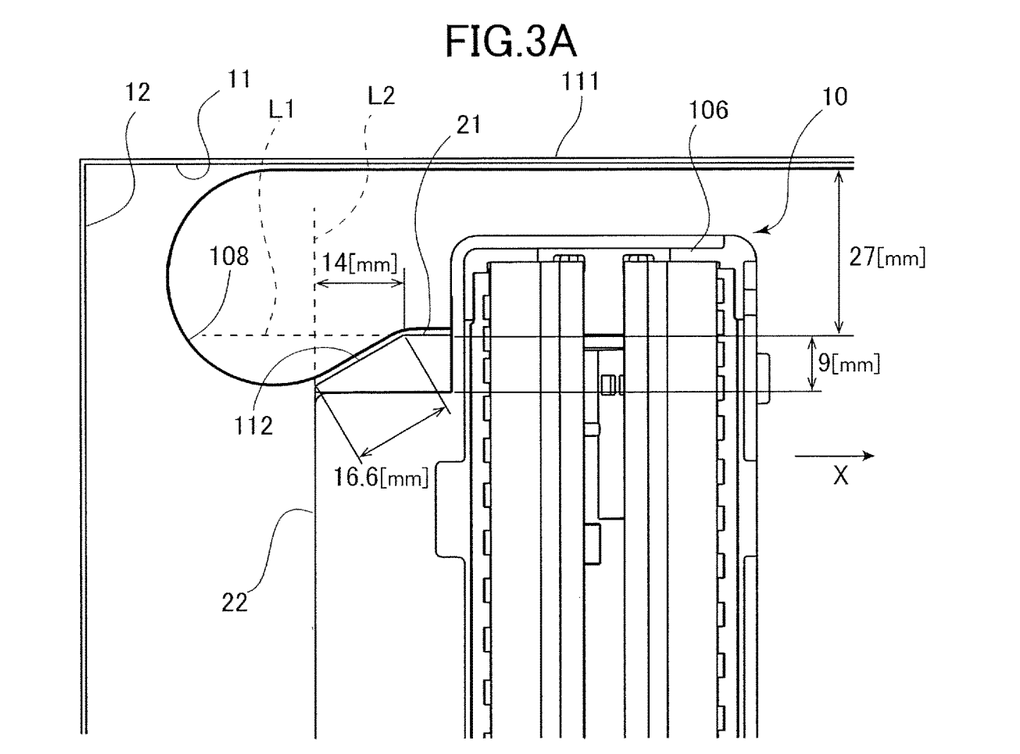
FIG. 3A is a plan view illustrating a reading unit located at a standby position.
Figure 3B:
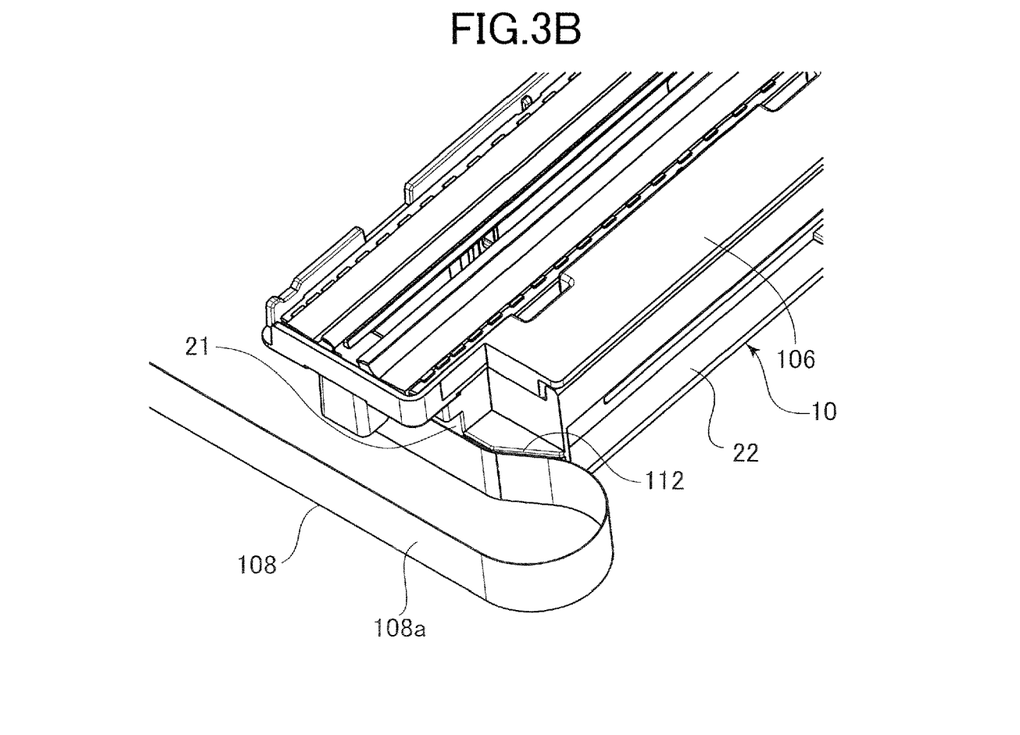
FIG. 3B is a perspective view illustrating the reading unit and an FFC.

FIG. 3A is a plan view illustrating a state where the reading unit 10 is located at a standby position and FIG. 3B is a perspective view illustrating the reading unit 10 and the FFC 108 in the standby position. The standby position is a position at which the reading unit 10 stands by in a state where a reading operation is not performed.

As illustrated in FIG. 3A, the main body portion 111 accommodates the reading unit 10 in an inner space, and the inner space is formed by a sliding contact surface 11, a left side surface 12 serving as a side surface, and the like. The carriage 106 of the reading unit 10 has a first surface 21 facing the sliding contact surface 11 and a second surface 22 facing the left side surface 12 and disposed at a position farther from the sliding contact surface 11 than the first surface 21. The sliding contact surface 11 and the first surface 21 extend parallel to the sub-scanning direction, and the left side surface 12 and the second surface 22 extend in a main-scanning direction orthogonal to the sub-scanning direction.

The FFC 108 is drawn along the first surface 21 from the printed substrate 104a (see FIG. 1) of the reading unit 10 and is curved in the sub-scanning direction to abut against the sliding contact surface 11 when the reading unit 10 is located at the standby position. That is, a flat surface 108a (see FIG. 3B), which is a wide surface of the FFC 108, abuts against the first surface 21 and is brought into contact with on the sliding contact surface 11 near the standby position when the reading unit 10 moves in the sub-scanning direction along with the reading operation.

The FFC 108 curves in a substantially horizontal direction so as to press the flat surface 108a against the sliding contact surface 11 when moving in the sub-scanning direction, and the FFC 108 is supported by the sliding contact surface 11 so that drooping of the FFC 108 due to gravity is reduced. Therefore, the contact of the FFC 108 with a bottom surface of the main body portion 111 can be reduced and disconnection of the FFC 108 can be prevented. The sliding contact surface 11 is formed with a through-hole (not illustrated) and the FFC 108 is connected to the control substrate 109 (see FIG. 1) provided outside the image reading apparatus 100 through the through-hole.

Figure 6:
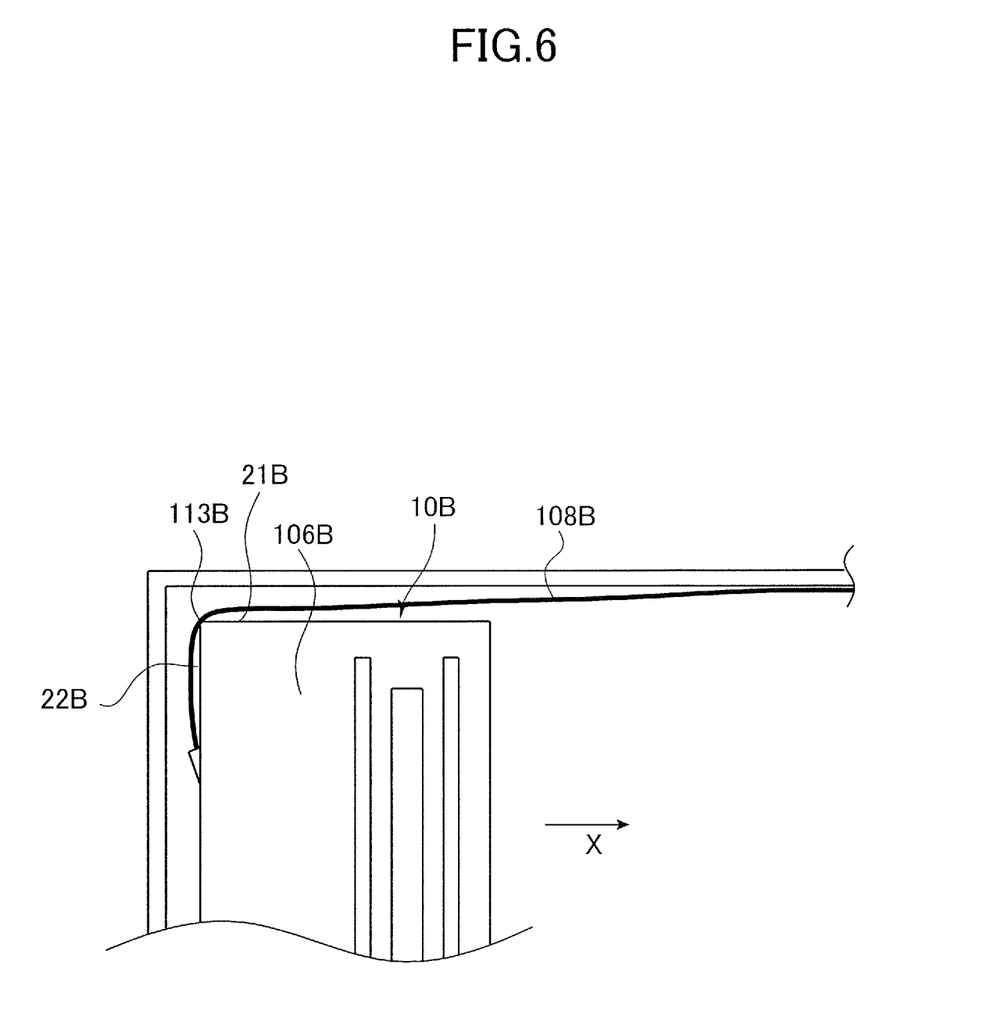
FIG. 6 is a plan view illustrating a reading unit and an FFC as a comparative example.

Here, a reading unit 10B as a comparative example will be described with reference to FIG. 6. A carriage 106B of the reading unit 10B has a substantially rectangular parallelepiped shape and a corner 113B is formed between a first surface 21B and a second surface 22B. The reading unit 10B repeatedly moves in the sub-scanning direction (arrow X direction) along with the reading operation and, in this case, the corner 113B of the carriage 106B comes into contact with a FFC 108B. The FFC 108B hardly comes into contact with portions of the carriage 106B other than the corner 113B, and a load of the FFC 108B is concentrated on and received by the corner 113B. Therefore, there is a concern that the FFC 108B is broken due to the surface being worn or disconnection.

Figure 4:
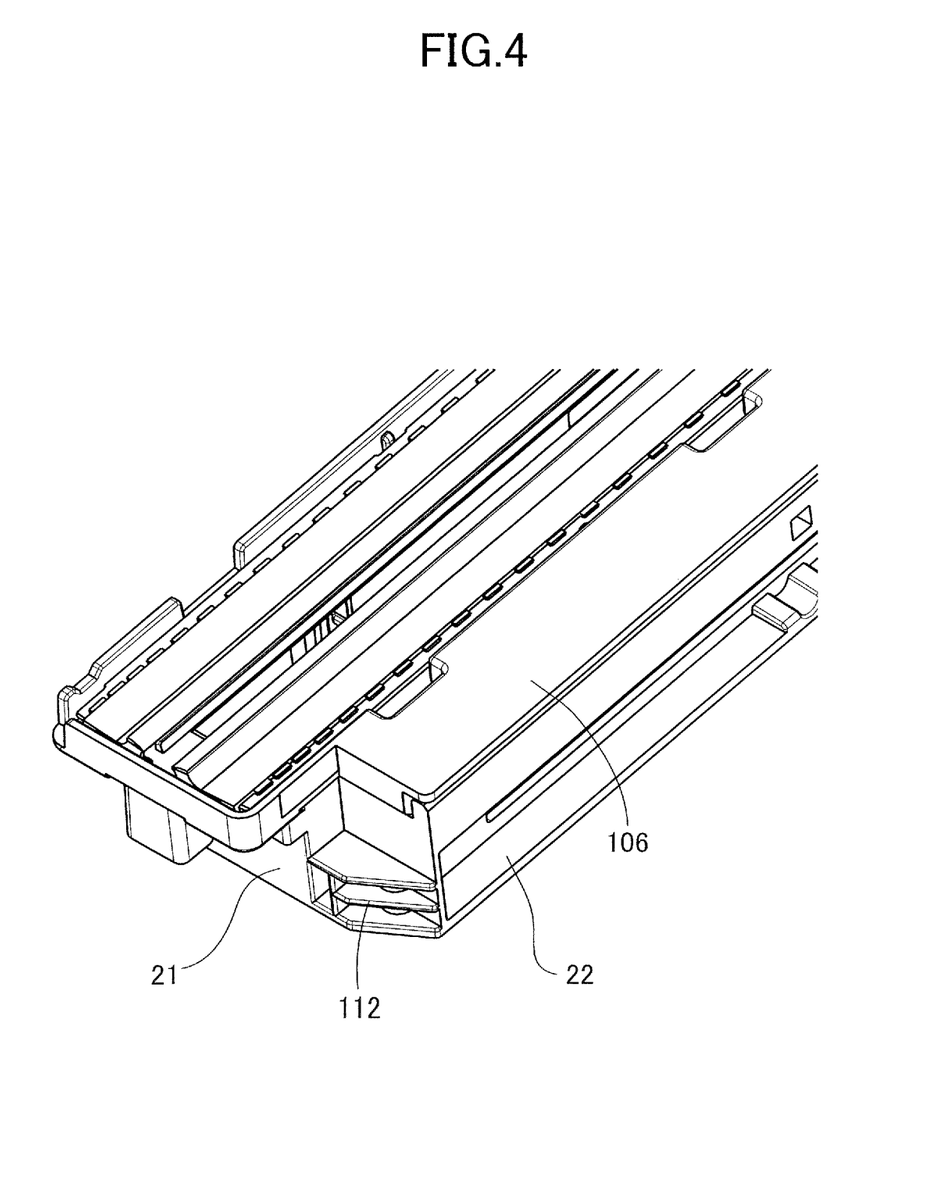
FIG. 4 is a perspective view illustrating a housing of the reading unit.

Therefore, in the embodiment, as illustrated in FIGS. 3A, 3B, and 4, a connecting surface 112 connecting the first surface 21 and the second surface 22 of the carriage 106 is provided. Here, when viewed in a normal direction orthogonal to the document platen glass 110 (see FIG. 1), that is, in plan view, a first extension line L1 including the first surface 21 and a second extension line L2 including the second surface 22 are drawn.

In this case, the connecting surface 112 extends in a direction intersecting an extension direction of the first extension line L1, that is, the sub-scanning direction and an extension direction of the second extension line L2, that is, the main-scanning direction. Furthermore, the connecting surface 112 is provided at a position farther from the sliding contact surface 11 than the first extension line L1 and farther from the left side surface 12 than the second extension line L2 in plan view.

As illustrated in FIG. 4, the connecting surface 112 is formed of a plurality of ribs in order to prevent a problem such as warpage when forming the carriage 106 by injection molding. The connecting surface 112 is not limited to one configured by the plurality of the ribs described above, and may be configured by, for example, one or a plurality of planes. The carriage 106 is not limited to a resin material, and may be made of another material such as a metal material.

As illustrated in FIGS. 3A and 3B, the connecting surface 112 is provided over an entire area of the carriage 106 in a height direction, but is not limited to the configuration. The connecting surface 112 may be provided at a part in the height direction as long as the connecting surface 112 is provided at a position corresponding to a height of the FFC 108 disposed at least between the first surface 21 and the sliding contact surface 11.

Since the carriage 106 is configured as described above, as illustrated in FIGS. 3A and 3B, the flat surface 108a of the FFC 108 abuts against the first surface 21 and the connecting surface 112 of the carriage 106 when the reading unit 10 performs the reading operation. As described above, since the FFC 108 comes into surface contact with the carriage 106 in a relatively wide surface, a load applied from the carriage 106 to the FFC 108 is dispersed and breakage of the FFC 108 can be reduced.

As illustrated in FIG. 3A, the connecting surface 112 abuts against a region, of the FFC 108, which is curved to a side farther from the sliding contact surface 11 than the first extension line L1, and which is separated from the first surface 21 and the sliding contact surface 11 when the reading unit 10 is located at the standby position. As described above, when the reading unit 10 is located at the standby position near the left side surface 12 of the main body portion 111, a curvature of the curved FFC 108 is increased and the load acting on the FFC 108 is increased.

However, in the embodiment, since the connecting surface 112 is formed at a rear left end of the carriage 106, the FFC 108 separated from the first surface 21 can escape to a side far from the sliding contact surface 11, and the curvature of the FFC 108 can be reduced. Therefore, breakage of the FFC 108 can be reduced.

Examples

Next, an example of dimensions of the carriage 106 and the main body portion 111 will be illustrated. As illustrated in FIG. 3A, a distance between the sliding contact surface 11 and the first surface 21 is set to 27 mm and a length of the connecting surface 112 in the sub-scanning direction is set to 14 mm. In addition, a length of the connecting surface 112 in the main-scanning direction is set to 9 mm and a width of the connecting surface 112 in a surface direction is set to 16.6 mm.

In particular, it is preferable that the length of the connecting surface 112 in the sub-scanning direction is set to a length of one third or more and two thirds or less of the distance between the sliding contact surface 11 and the first surface 21. In addition, it is preferable that the length of the connecting surface 112 in the main-scanning direction is set to a length of one fourth or more and a half or less of the distance between the sliding contact surface 11 and the first surface 21. This is because if the connecting surface 112 is too short, the connecting surface 112 comes into contact with the FFC 108 in a narrow area, which is insufficient to reduce the breakage of the FFC 108. If the connecting surface 112 is too long, the carriage 106 becomes large and the entire image reading apparatus 100 becomes large in size.

Another Embodiment

Figure 5:
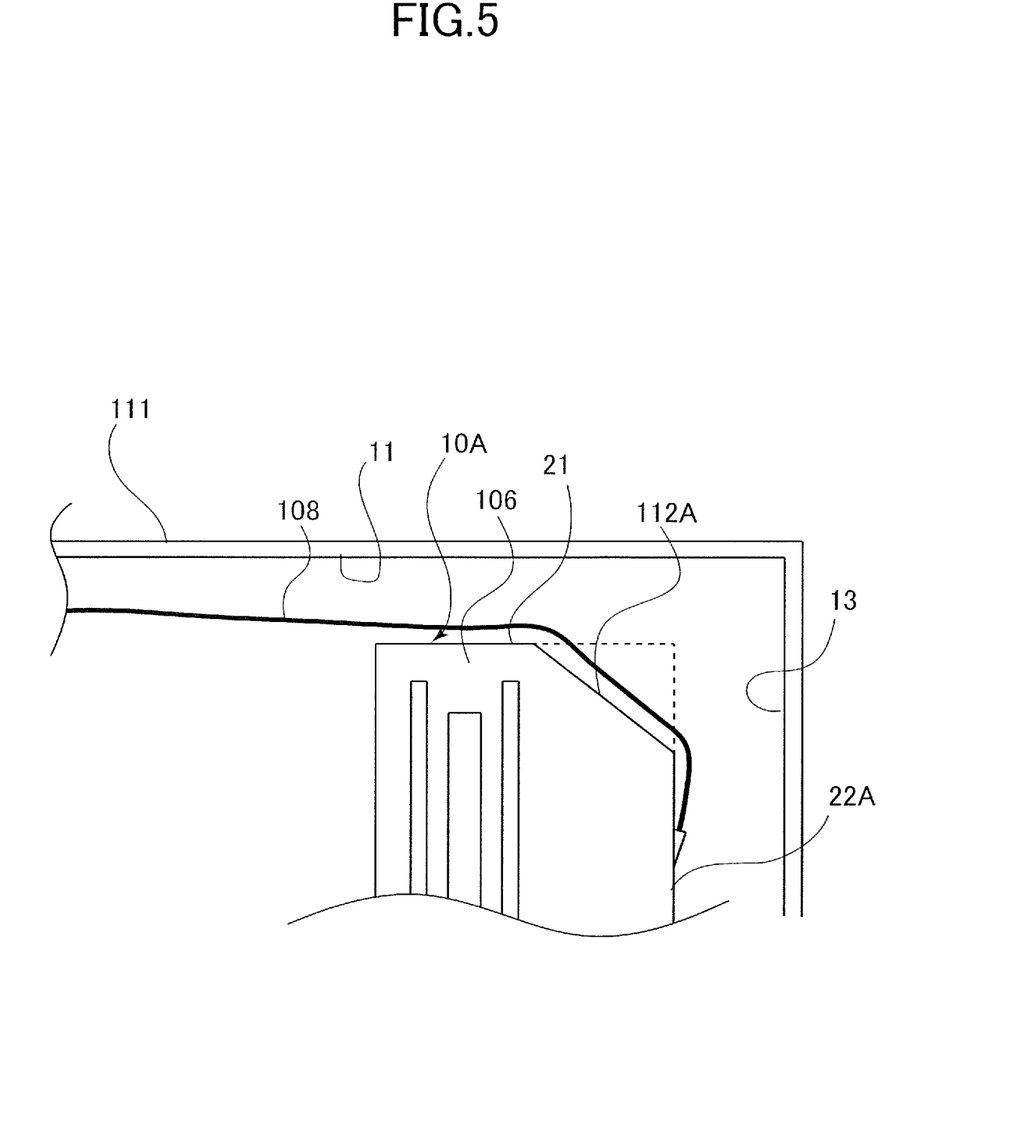
FIG. 5 is a plan view illustrating a reading unit according to another embodiment.

The connecting surface of the carriage 106 is not limited to the rear left end of the carriage 106 and may be formed at another position. For example, as illustrated in FIG. 5, a connecting surface 112A may be provided at a rear right end of the carriage 106. FIG. 5 is a plan view illustrating a state where a reading unit 10A is located at an end position farthest from the standby position in a moving range.

The connecting surface 112A connects the first surface 21 and a second surface 22A facing a right side surface 13 serving as a side surface of the main body portion 111. The connecting surface 112A can reduce a load on the FFC 108 particularly when the reading unit 10A is located at an end position during the reading operation. For example, if a sliding contact surface on which the FFC 108 slides is formed on a front side of the main body portion 111, the connecting surface may be formed in a front left end or a front right end of the carriage 106.

The connecting surface 112 is not limited to one linear surface and may be formed by, for example, a curved surface, or may be formed by a plurality of linear surfaces having a plurality of refraction points.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-138378, filed Jul. 24, 2018, which is hereby incorporated by reference herein in its entirety.

What is claimed is:

1. An image reading apparatus comprising:
   a sheet support surface through which light is transmitted and on which a sheet is supported;
   a reading unit configured to perform a reading operation of reading an image of the sheet supported on the sheet support surface while moving in a sub-scanning direction, the reading unit comprising:
   a light source configured to irradiate the sheet supported on the sheet support surface with the light through the sheet support surface;
   an imaging unit configured to receive the light irradiated from the light source and reflected by the sheet, and convert the light into an image signal; and
   a housing configured to support the light source and the imaging unit;
   a main body portion configured to accommodate the reading unit; and
   a flat cable of which one end is connected to the reading unit, and which transmits the image signal to the reading unit, the flat cable being curved while the reading unit moves in the sub-scanning direction, wherein the main body portion comprises:
- a sliding contact surface extending in the sub-scanning direction and configured to be brought into sliding contact with a flat surface of the flat cable in a case where the flat cable is being curved; and
- a side surface facing the reading unit in the sub-scanning direction, wherein the housing comprises:
- a first surface facing the sliding contact surface and abutting against the flat surface of the flat cable;
- a second surface facing the side surface and disposed at a position farther from the sliding contact surface than the first surface in a main-scanning direction orthogonal to the sub-scanning direction; and
- a connecting surface disposed at a position farther from the sliding contact surface in the main-scanning direction than a first extension line including the first surface and farther from the side surface in the sub-scanning direction than a second extension line including the second surface when viewed in a normal direction orthogonal to a surface direction of the sheet support surface, the connecting surface being configured to connect the first surface and the second surface, and wherein the connecting surface abuts against the flat surface of the flat cable in a case where the reading unit performs the reading operation.

2. The image reading apparatus according to claim 1, wherein the flat cable is curved in a substantially horizontal direction while the reading unit moves in the sub-scanning direction.

3. The image reading apparatus according to claim 1, wherein the connecting surface abuts against a region, of the flat cable, which is curved to a side farther from the sliding contact surface than the first extension line, and which is separated from the first surface and the sliding contact surface in a state where the reading unit is located at a standby position at which the reading unit stands by without performing the reading operation.

4. The image reading apparatus according to claim 1, wherein the connecting surface abuts against the flat surface of the flat cable in a state where the reading unit is located at an end position farthest in a moving range of the reading unit from a standby position at which the reading unit stands by without performing the reading operation.

5. The image reading apparatus according to claim 1, wherein the connecting surface extends in a direction intersecting an extension direction of the first extension line and an extension direction of the second extension line.

6. The image reading apparatus according to claim 5, wherein the extension direction of the first extension line is the sub-scanning direction, and
wherein the extension direction of the second extension line is the main-scanning direction.

7. The image reading apparatus according to claim 6, wherein the connecting surface has a length, in the sub-scanning direction, of one third or more and two thirds or less of a distance between the sliding contact surface and the first surface, and has a length, in the main-scanning direction, of one fourth or more and a half or less of the distance.

8. The image reading apparatus according to claim 1, wherein the connecting surface is provided at a position corresponding to a height of the flat cable disposed between the first surface and the sliding contact surface.

9. The image reading apparatus according to claim 1, wherein the connecting surface comes into surface contact with the flat surface of the flat cable.

* * * * *